United States Patent
Soma

(10) Patent No.: US 10,791,738 B1
(45) Date of Patent: *Oct. 6, 2020

(54) COMPOSITION AND METHOD FOR PROTECTING PLANT AGAINST DISEASE AND PEST

(71) Applicant: SUMITOMO CHEMICAL COMPANY, LIMITED, Tokyo (JP)

(72) Inventor: Masato Soma, Takarazuka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,674

(22) Filed: Mar. 12, 2020

Related U.S. Application Data

(62) Division of application No. 16/442,127, filed on Jun. 14, 2019, now Pat. No. 10,624,344.

(60) Provisional application No. 62/839,004, filed on Apr. 26, 2019.

(51) Int. Cl.
  *A01N 31/04* (2006.01)
  *A01N 43/40* (2006.01)
  *A01N 43/56* (2006.01)

(52) U.S. Cl.
  CPC ............ *A01N 43/40* (2013.01); *A01N 43/56* (2013.01)

(58) Field of Classification Search
  CPC ...................................................... A01N 31/04
  USPC ................................................ 514/357, 423
  See application file for complete search history.

(56) References Cited

U.S. PATENT DOCUMENTS

| | | |
|---|---|---|
| 2005/0234110 A1 | 10/2005 | Mansfield et al. |
| 2008/0153707 A1 | 6/2008 | Gewehr et al. |
| 2018/0213798 A1 | 8/2018 | Hirotomi et al. |

FOREIGN PATENT DOCUMENTS

| | | |
|---|---|---|
| JP | 2019-48845 A | 3/2019 |
| WO | WO 2004/016088 A2 | 2/2004 |
| WO | WO 2006/087434 A1 | 8/2006 |
| WO | WO 2008/095890 A1 | 8/2008 |
| WO | WO 2014/020109 A1 | 2/2014 |
| WO | WO 2017/018464 A1 | 2/2017 |
| WO | WO 2017/183664 A | 10/2017 |

OTHER PUBLICATIONS

International Search Report, dated Jun. 30, 2020, for International Application No. PCT/JP2020/015554.

Witten Opinion of the International Searching Authority, dated Jun. 30, 2020, for International Application No. PCT/JP2020/015554.

*Primary Examiner* — Raymond J Henley, III

(74) *Attorney, Agent, or Firm* — Birch, Stewart, Kolasch & Birch, LLP

(57) ABSTRACT

The present invention can provide a composition and a method excellent in plant protection effect against diseases and pests. The composition comprises fluopyram and fluxapyroxad, and the method comprises a step of applying fluopyram and fluxapyroxad to a plant or soil for cultivating the plant.

2 Claims, No Drawings

COMPOSITION AND METHOD FOR PROTECTING PLANT AGAINST DISEASE AND PEST

CROSS REFERENCE TO RELATED APPLICATIONS

This application is a Divisional application of co-pending application Ser. No. 16/442,127, filed on Jun. 14, 2019, which claims the benefit under 35 U.S.C. § 119(e) to U.S. Provisional Application No. 62/839,004, filed on Apr. 26, 2019, all of which are hereby expressly incorporated by reference into the present application.

TECHNICAL FIELD

The present invention relates to a composition for protecting plants against diseases and pests and a method for protecting plants against diseases and pests.

BACKGROUND ART

Hitherto, many compounds have been known as active ingredients of agrochemicals (for example, Patent Documents 1 and 2).

CITATION LIST

Patent Documents

Patent Document 1: WO 2004/016088
Patent Document 2: WO 2006/087343

SUMMARY OF THE INVENTION

Problems to be Solved by the Invention

An object of the present invention is to provide a composition and a method excellent in plant protection effect against diseases and pests.

Means for Solving the Problems

The present inventor has intensively studied to find out a composition and method excellent in plant protection effect against diseases and pests. As a result, He has found out that a composition comprising fluopyram and fluxapyroxad shows a synergistic effect and is excellent in plant protection effect against diseases and pests.

That is, the present invention provides the followings:
[1] A composition comprising fluopyram and fluxapyroxad.
[2] The composition according to [1], wherein a weight ratio of fluopyram to fluxapyroxad is within a range of 1:0.1 to 1:10.
[3] A method for protecting plants against diseases and pests, the method comprising a step of applying each effective amount of fluopyram and fluxapyroxad to a plant or soil for cultivating the plant.
[4] The method according to [3], wherein a weight ratio of fluopyram to fluxapyroxad is within a range of 1:0.1 to 1:10.

Effect of the Invention

The present invention can protect plants against diseases and pests.

MODE FOR CARRYING OUT THE INVENTION

The composition of the present invention (hereinafter, referred to as "present composition") comprises fluopyram and fluxapyroxad.

Fluopyram is a known compound and is described on page 527 of The Pesticide Manual Eighteenth Edition (issued by BCPC). Fluopyram can be obtained from commercially available formulations or can be synthesized by known methods.

Fluxapyroxad is a known compound and is described on page 558 of The Pesticide Manual Eighteenth Edition (issued by BCPC). Fluxapyroxad can be obtained from commercially available formulations or can be synthesized by known methods.

The weight ratio of fluopyram to fluxapyroxad in the present composition is as follows: fluopyram:fluxapyroxad=1:0.001 to 1:1000, 1:0.002 to 1:500, 1:0.01 to 1:100, 1:0.1 to 1:10, or 1:0.1 to 1:5.

Although the present composition may be a mixture as itself of fluopyram and fluxapyroxad, the present composition is usually prepared by mixing fluopyram, fluxapyroxad and an inert carrier, and if necessary, adding a surfactant or other auxiliary agents for formulation, and then formulating into the form of oil solutions, emulsifiable concentrates, flowables, wettable powders, water dispersible granules, dusts, granules and the others. Such formulations may be used by itself or with an addition of other inert components as an agent for controlling diseases and pests.

The present composition may comprises usually 0.1 to 99% by weight, preferably 0.2 to 90% by weight, and further preferably 1 to 80% by weight of fluopyram and fluxapyroxad in total.

Examples of the inert carrier used upon formulation include solid carriers and liquid carriers. Examples of the solid carrier include finely-divided powders or particles consisting of minerals (for example, kaolin clay, attapulgite clay, bentonite, montmorillonite, acid clay, pyrophyllite, talc, diatomaceous earth, or calcite), natural organic substances (for example, corncob powder, or walnut shell powder), synthetic organic substances (for example, urea), salts (for example, calcium carbonate, or ammonium sulfate), synthetic inorganic substances (for example, synthetic hydrous silicon oxide) and so on. Examples of the liquid carrier include aromatic hydrocarbons (for example, xylene, alkyl benzene, or methylnaphthalene), alcohols (for example, 2-propanol, ethylene glycol, propylene glycol, or ethylene glycol monoethyl ether), ketones (for example, acetone, cyclohexanone, or isophorone), vegetable oils (for example, soybean oil, or cotton oils), petroleum-derived aliphatic hydrocarbons, esters, dimethyl sulfoxide, acetonitrile and water.

Examples of the surfactant include anionic surfactant (for example, alkyl sulfate salt, alkylaryl sulfonate salt, dialkyl sulfosuccinate salt, polyoxyethylene alkylaryl ether phosphates, lignin sulfonate, or naphthalene sulfonate formaldehyde polycondensation), nonionic surfactant (for example, polyoxyethylene alkylaryl ether, polyoxyethylene alkyl polyoxypropylene block copolymer, or sorbitan fatty acid ester) and cationic surfactant (for example, alkyltrimethyl ammonium salt).

Examples of the other auxiliary agents for formulation include water-soluble polymer (for example, polyvinyl alcohol, or polyvinyl pyrrolidone), polysaccharides (for example, arabic gum, alginic acid and salts thereof, CMC (carboxymethyl-cellulose), or xanthan gum), inorganic substances (for example, aluminum magnesium silicate, or alumina-sol), antiseptic agent, coloring agent, and PAP (isopropyl acid phosphate), and stabilizing agent (for example, BHT (2,6-di-tert-butyl-4-methylphenol)).

The present composition may also be prepared by separately formulating fluopyram and fluxapyroxad into different formulations respectively according to the above-mentioned processes, if necessary, further diluting them with water, thereafter, mixing the separately prepared different formulations or the resultant dilutions thereof with each other.

The present composition may further comprise one or more other fungicide(s) and/or insecticide(s).

The present composition can be applied to a plant or soil for cultivating the plant to protect plants against diseases and pests.

Examples of the diseases and pests which can be controlled by the present invention include harmful nematode and the following plant diseases.

Rice diseases: blast (*Magnaporthe grisea*), brown spot (*Cochliobolus miyabeanus*), sheath blight (*Rhizoctonia solani*), and bakanae disease (*Gibberella fujikuroi*);

Wheat diseases: powdery mildew (*Erysiphe graminis*), fusarium Head blight (*Fusarium graminearum, F. avenaceum, F. culmorum, Microdochium nivale*), rust (for example, yellow rust (*Puccinia striiformis*), black rust (*P. graminis*), Brown rust (*P. recondita*)), snow mold (*Microdochium nivale*), typhula snow blight (*Typhula* sp.), loose smut (*Ustilago tritici*), stinking smut (*Tilletia caries*), eyespot (*Pseudocercosporella herpotrichoides*), Septoria leaf blotch (*Mycosphaerella graminicola*), glume blotch (*Stagonospora nodorum*), and tan spot (*Pyrenophora tritici-repentis*);

Barley diseases: powdery mildew (*Erysiphe graminis*), loose smut (*Fusarium graminearum, F. avenaceum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and damping-off caused by rhizoctonia fungus (*Rhizoctonia solani*);

Corn diseases: smut (*Ustilago maydis*), southern leaf blight (*Cochliobolus heterostrophus*), zonate leaf spot (*Gloeocercospora sorghi*), southern rust (*Puccinia polysora*), gray leaf spot (*Cercospora zeae-maydis*), and damping-off caused by rhizoctonia fungus (*Rhizoctonia solani*);

Citrus diseases: melanose (*Diaporthe citri*), scab (*Elsinoe fawcetti*), and fruit rot (*Penicillium digitatum, P. italicum*);

Apple diseases: blossom blight (*Monilinia mali*), canker (*Valsa ceratosperma*), powdery mildew (*Podosphaera leucotricha*), Alternaria leaf spot (*Alternaria alternata* apple pathotype), scab (*Venturia inaequalis*), and bitter rot (*Colletotrichum acutatum*);

Pear diseases: scab (*Venturia nashicola*, V. pirina), black spot (*Alternaria alternata* Japanese pear pathotype), rust (*Gymnosporangium haraeanum*), and brown spot (*Stemphilium vesicarium*);

Peach diseases: brown rot (*Monilinia fructicola*), scab (*Cladosporium carpophilum*), and *Phomopsis* rot (*Phomopsis* sp.);

Grapes diseases: anthracnose (*Elsinoe ampelina*), ripe rot (*Glomerella cingulata*), powdery mildew (*Uncinula necator*), rust (*Phakopsora ampelopsidis*), and black rot (*Guignardia bidwellii*);

Diseases of Japanese persimmon: anthracnose (*Gloeosporium kaki*), and leaf spot (*Cercospora kaki, Mycosphaerella nawae*);

Diseases of Cucurbitaceae: anthracnose (*Colletotrichum lagenarium*), powdery mildew (*Sphaerotheca fuliginea*), gummy stem blight (*Mycosphaerella melonis*), and *Fusarium* wilt (*Fusarium oxysporum*);

Tomato diseases: early blight (*Alternaria solani*), and leaf mold (*Cladosporium fulvum*);

Eggplant disease: brown spot (*Phomopsis vexans*), and powdery mildew (*Erysiphe cichoracearum*);

Diseases of *brassica* plants: *Alternaria* leaf spot (*Alternaria japonica*), white spot (*Cercosporella brassicae*), and clubroot (*Plasmodiophora brassicae*);

Welsh onion diseases: rust (*Puccinia allii*).

Soybean diseases: purple stain (*Cercospora kikuchii*), *Sphaceloma* scad (*Elsinoe glycines*), pod and stem blight (*Diaporthe phaseolorum* var. *sojae*), septoria brown spot (*Septoria glycines*), *Cercospora* leaf spot (*Cercospora sojina*), rust (*Phakopsora pachyrhizi*), damping-off caused by *rhizoctonia* fungus (*Rhizoctonia solani*), target spot (*Corynespora casiicola*), and sclerotinia rot (*Sclerotinia sclerotiorum*);

Kidney bean diseases: anthracnose (*Colletotrichum lindemthianum*);

Peanut diseases: leaf spot (*Cercospora personata*), brown leaf spot (*Cercospora arachidicola*), and southern blight (*Sclerotium rolfsii*);

Garden pea diseases: powdery mildew (*Erysiphe pisi*); Potato diseases: early blight (*Alternaria solani*), pink rot (*Phytophthora erythroseptica*), and powdery scab (*Spongospora subterranean* f. sp. *subterranea*);

Strawberry diseases: powdery mildew (*Sphaerotheca humuli*), and anthracnose (*Glomerella cingulata*);

Tea diseases: net blister blight (*Exobasidium reticulatum*), white scab (*Elsinoe leucospila*), gray blight (*Pestalotiopsis* sp.), and anthracnose (*Colletotrichum theae-sinensis*);

Tobacco diseases: brown spot (*Alternaria longipes*), powdery mildew (*Erysiphe cichoracearum*), and anthracnose (*Colletotrichum tabacum*);

Rape seed diseases: *sclerotinia* rot (*Sclerotinia sclerotiorum*), and rape seed damping-off caused by *Rhizoctonia solani* (*Rhizoctonia solani*);

Cotton diseases: cotton damping-off caused by *Rhizoctonia solani* (*Rhizoctonia solani*);

Sugar beet diseases: cercospora leaf spot (*Cercospora beticola*), leaf blight (*Thanatephorus cucumeris*), root rot (*Thanatephorus cucumeris*), and aphanomyces root rot (*Aphanomyces cochlioides*);

Rose diseases: blackspot (*Diplocarpon rosae*), and powdery mildew (*Sphaerotheca pannosa*);

Diseases of *chrysanthemum* and Asteraceae plants: leaf blight (*Septoria chrysanthemi-indici*), and white rust (*Puccinia horiana*);

Various plants diseases: Gray mold (*Botrytis cinerea*), and *Sclerotinia* rot (*Sclerotinia sclerotiorum*);

Japanese radish diseases: *Alternaria* leaf spot (*Alternaria brassicicola*);

Turfgrass diseases: dollar spot (*Sclerotinia homeocarpa*), brown patch, and large patch (*Rhizoctonia solani*);

Banana diseases: Sigatoka disease (*Mycosphaerella fijiensis, Mycosphaerella musicola*);

Seed diseases or diseases in the early stages of the growth of various plants caused by bacteria of *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp., *Diplodia* spp.; and Viral diseases of various plants mediated by *Polymixa* spp. or *Olpidium* spp.

Examples of the plants to which the present composition can be applied include the followings.

Crops: corn, rice, wheat, barley, rye, oat, sorghum, cotton, soybean, azuki bean, kidney bean, peanut, buckwheat, beet, rapeseed, sunflower, sugar cane, tobacco, and the others;

Vegetables: Solanaceous vegetables (for example, eggplant, tomato, green pepper, hot pepper, or potato), Cucurbitaceous vegetables (for example, cucumber, pumpkin, zucchini, watermelon, melon, or squash), Cruciferous vegetables (for example, Japanese radish, white turnip, horseradish, kohlrabi, Chinese cabbage, cabbage, leaf mustard, broccoli, or cauliflower), Asteraceous vegetables (for example, burdock, garland chrysanthemum, artichoke, or lettuce), Liliaceous vegetables (for example, welsh onion, onion, garlic, or asparagus), Ammiaceous vegetables (for example, carrot, parsley, celery, or parsnip), Chenopodiaceous vegetables (for example, spinach, or Swiss chard), Lamiaceous vegetables (for example, *perilla*, mint, or basil), strawberry, sweet potato, glutinous yam, eddo, and the others;

Flowers;

Foliage plants;

Turfgrass;

Fruits: pomaceous fruits (for example, apple, common pear, Japanese pear, Chinese quince, or quince), stone fleshy fruits (for example, peach, plum, nectarine, Japanese apricot (*Prunus mume*), cherry fruit, apricot, or prune), citrus plants (for example, Citrus unshiu, orange, lemon, lime, or grapefruits), nuts (for example, chestnuts, walnuts, hazel nuts, almond, pistachio, cashew nuts, or macadamia nuts), berry fruits (for example, blueberry, cranberry, blackberry, or raspberry), grapes, Japanese persimmon, olive, loquat, banana, coffee, date palm, coconuts, and the others; and Trees other than fruit trees: tea, mulberry, flowering plants, street trees (for example, ash tree, birch, dogwood, *eucalyptus*, ginkgo (*Ginkgo biloba*), lilac, maple tree, oak (*quercus*), poplar, *cercis*, Formosan gum (*Liquidambar formosana*), plane tree, *zelkova*, Japanese arborvitae (*Thuja standishii*), Japanese fir, hemlock, juniper, *pinus*, spruce, or yew (*Taxus cuspidate*)), and the others.

The above-mentioned "plant(s)" may include plant(s) whose resistance has been imparted by genetic recombination.

Exemplary embodiments of the present composition include the following compositions.

A composition comprising fluopyram and fluxapyroxad, wherein the weight ratio of fluopyram to fluxapyroxad is within the range of 1:0.001 to 1:1000

A composition comprising fluopyram and fluxapyroxad, wherein the weight ratio of fluopyram to fluxapyroxad is within the range of 1:0.002 to 1:500

A composition comprising fluopyram and fluxapyroxad, wherein the weight ratio of fluopyram to fluxapyroxad is within the range of 1:0.01 to 1:100

A composition comprising fluopyram and fluxapyroxad, wherein the weight ratio of fluopyram to fluxapyroxad is within the range of 1:0.1 to 1:10

A composition comprising fluopyram and fluxapyroxad, wherein the weight ratio of fluopyram to fluxapyroxad is within the range of 1:0.1 to 1:5

The method for protecting plants against diseases and pests of the present invention (hereinafter, referred to as "method of the present invention") is carried out by applying each effective amount of fluopyram and fluxapyroxad to a plant or soil for cultivating the plant. Examples of the plant include foliage of a plant, seeds of a plant and bulbs of a plant. Moreover, the bulbs described herein mean discoid stems, corms, rhizomes, tubers, tuberous, and tuberous roots.

In the method of the present invention, fluopyram and fluxapyroxad may be applied separately to a plant or soil for cultivating the plant in the same period.

In the method of the present invention, examples of the method of applying fluopyram and fluxapyroxad include foliage treatment, soil treatment, root treatment, and seed treatment.

Such the foliage treatment includes, for example, a method of applying fluopyram and fluxapyroxad onto surface of a plant to be cultivated by a foliar application or a stem application.

Such the soil treatment includes, for example, soil broadcast, soil incorporation, and irrigation of the chemical liquid comprising fluopyram and fluxapyroxad to a soil.

Such the root treatment includes, for example, a method of soaking a whole or a root of the plant into a chemical liquid comprising fluopyram and fluxapyroxad, and a method of attaching a solid formulation comprising fluopyram, fluxapyroxad and the solid carrier to a root of the plant.

Such the seed treatment includes, for example, an applying of the present composition to a seed or a bulb of the plant to be protected against diseases and pests, specifically, for example, spray treatment by spraying a suspension of the present composition in a mist form onto the surface of a seed or the surface of a bulb, smear treatment by applying the wettable powders, the emulsifiable concentrates or the flowables of the present composition with added by small amounts of water or as itself to a seed or a bulb, immersion treatment by immersing a seed into a solution of the present composition for a certain period of time, film-coating treatment and pellet-coating treatment.

Also, fluopyram and fluxapyroxad may be applied to a plant or soil for cultivating the plant by different application methods. For example, seed treatment may be adopted as an application method of fluopyram, and foliage treatment or soil treatment may be adopted as an application method of fluxapyroxad.

Each application rate of fluopyram and fluxapyroxad in the method of the present invention may be varied depending on a kind of plant to be applied, a kind or a frequency of an occurrence of diseases and pests as a control subject, a formulation type, an application period, an application method, an application site, a climate condition, and the like. In case of an application to a foliage of the plant or soil for cultivating the plant, a total amount of fluopyram and fluxapyroxad is within the range of usually 1 to 500 g, preferably 2 to 200 g, and further preferably 10 to 100 g, per 1000 $m^2$. Also a total amount of fluopyram and fluxapyroxad in the treatment for seed is within the range of usually 0.001 to 10 g, and preferably 0.01 to 1 g, per 1 kg of seeds.

The emulsifiable concentrates, the wettable powders or the flowables, etc., are usually applied by diluting them with water, and then spreading them. In this case, each concentration of fluopyram and fluxapyroxad contains usually 0.0005 to 2% by weight, and preferably 0.005 to 1% by weight of fluopyram and fluxapyroxad in total. The dusts or the granules, etc., are usually applied as itself without diluting them.

EXAMPLES

The present invention is described in more detail below by Formulation Examples and Test Examples.

First, Formulation Examples are described. Herein, "parts" means "parts by weight".

Formulation Example 1

Five (5) parts of fluopyram, 5 parts of fluxapyroxad, parts of a mixture of white carbon and ammonium polyoxyethylene alkyl ether sulfate (the weight ratio of 1:1), and 55 parts of water are mixed, and the resultant mixture is then subjected to fine grinding according to a wet grinding method to obtain a flowable.

Formulation Example 2

Ten (10) parts of fluopyram, 5 parts of fluxapyroxad, 1.5 parts of sorbitan trioleate, and 28 parts of aqueous polyvinyl alcohol solution that contains 2 parts of polyvinyl alcohol are mixed, and the resultant mixture is then subjected to fine grinding according to a wet grinding method, and thereto are added 45.50 parts of a mixture that contains 0.05 parts of xanthan gum, 0.1 parts of aluminum magnesium silicate and 45.35 parts of water, followed by adding 10 parts of propylene glycol, and blended by stirring to obtain a flowable.

Formulation Example 3

Ten (10) parts of fluopyram, 40 parts of fluxapyroxad, 3 parts of calcium lignosulfonate, 2 parts of sodium lauryl sulfate, and 45 parts of synthetic hydrous silicon oxide are fully ground and mixed to obtain a wettable powder.

Formulation Example 4

Five (5) parts of fluopyram, 5 parts of fluxapyroxad, 14 parts of polyoxyethylene styryl phenyl ether, 6 parts of calcium dodecylbenzenesulfonate, and 70 parts of xylene are mixed thoroughly to obtain a formulation.

Next, Test Examples are described.

Test Example 1

Fluopyram and fluxapyroxad were respectively dissolved in dimethyl sulfoxide, and agent solutions were prepared so that the concentration of each compound was 100 times the concentration described in Table 1. The agent solution was dispensed into each well of a microtiter plate (96 wells) in 1 μl portion, and then 99 μL of YBG medium to which *conidia* of *Septoria* leaf blotch (*Mycosphaerella graminicola*) was inoculated in advance (which was prepared by dissolving 10 g of yeast extract, 10 g of Bacto Peptone, and 20 mL of glycerol into 1 L of water, followed by sterilizing the medium) was dispensed into each of the well to which the agent solution was dispensed. The plate was cultivated at 18° C. for four days, thereby allowing *Septoria* leaf blotch to undergo proliferation, and the absorbance at 600 nm of a sample in each well of the microtiter plate was then measured to examine a degree of growth of *Septoria* leaf blotch (hereinafter referred to as "treated group"). Whereas, *Septoria* leaf blotch was grown similarly to the case of the treated group using dimethyl sulfoxide instead of the agent solution, and the degree of growth was measured (hereinafter referred to as "untreated group"). The efficacy was calculated from each of the obtained degree of growth of the treated group and the untreated group respectively by the following "Equation 1".

From the test results, it was acknowledged that a synergistic effect was shown in the mixed-use group of fluopyram and fluxapyroxad in comparison with the case of each of the single-use group of the above-mentioned compounds respectively.

$$\text{Efficacy}(\%)=100\times(X-Y)/X \qquad \text{Equation 1}$$

X: Degree of growth of fungus in the untreated group

Y: Degree of growth of fungus in the treated group

TABLE 1

| Application concentration (ppm) | | Efficacy |
|---|---|---|
| Fluopyram | Fluxapyroxad | (%) |
| 0.1 | — | 24 |
| — | 0.5 | 82 |
| 0.1 | 0.5 | 94 |
| 1.75 | — | 60 |
| — | 0.18 | 71 |
| 1.75 | 0.18 | 97 |

The invention claimed is:

1. A composition comprising fluopyram and fluxapyroxad, wherein a weight ratio of fluopyram to fluxapyroxad is within a range of 1:0.01 to 1:10.

2. A method for protecting plants against diseases and pests, the method comprising a step of applying each effective amount of fluopyram and fluxapyroxad to a plant or soil for cultivating the plant, wherein a weight ratio of fluopyram to fluxapyroxad is within a range of 1:0.01 to 1:10.

* * * * *